US012639146B2

(12) United States Patent
Gourgoulias et al.

(10) Patent No.: US 12,639,146 B2
(45) Date of Patent: May 26, 2026

(54) SYSTEMS AND METHOD FOR ANOMALY DETECTION PIPELINE WITH FEW-SHOT LANGUAGE MODELS

(71) Applicant: JPMORGAN CHASE BANK, N.A., New York, NY (US)

(72) Inventors: Konstantinos Gourgoulias, London (GB); Bruce Peikon, East Northport, NY (US); William Joel Guest, Conroe, TX (US); Senad Ibraimoski, London (GB); Gaston Liberman, Buenos Aires (AR); Najah Ghalyan, Wayne, NJ (US); Leandro Rios, Capital Federal (AR); Sean Moran, London (GB); Alexandru-Petre Cazan, Mumbai Suburban (IN); Rozie Tereza Yeghiazarian, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 15 days.

(21) Appl. No.: 18/769,156

(22) Filed: Jul. 10, 2024

(65) Prior Publication Data

US 2025/0362989 A1    Nov. 27, 2025

(30) Foreign Application Priority Data

May 23, 2024    (GR) .............................. 20240100392

(51) Int. Cl.
*G06F 11/07*        (2006.01)
*G06F 11/14*        (2026.01)
    (Continued)

(52) U.S. Cl.
CPC ...... *G06F 11/0751* (2013.01); *G06F 11/1423* (2013.01); *G06F 11/2002* (2013.01); *G06N 3/0895* (2023.01); *G06F 11/0793* (2013.01)

(58) Field of Classification Search
CPC ............... G06F 11/0751; G06F 11/079; G06F 11/0793; G06N 3/0895; H04L 41/06; H04L 41/0631; H04L 41/064
See application file for complete search history.

(56) References Cited

U.S. PATENT DOCUMENTS

2023/0376789 A1 * 11/2023 Pryzant .................. G06N 5/025

OTHER PUBLICATIONS

Johnphill O, Sadiq AS, Al-Obeidat F, Al-Khateeb H, Taheir MA, Kaiwartya O, Ali M. Self-Healing in CyberâPhysical Systems Using Machine Learning: A Critical Analysis of Theories and Tools. Future Internet. 2023; 15(7):244. https://doi.org/10.3390/fi15070244 (Year: 2023).*

(Continued)

*Primary Examiner* — Marc Duncan
*Assistant Examiner* — Albert Li
(74) *Attorney, Agent, or Firm* — GREENBERG TRAURIG LLP

(57) ABSTRACT

A method may include: receiving a plurality of log-text examples from network devices and labels indicating if the log-text example is anomalous or not anomalous; identifying, from the log-text examples and labels, rules for weak annotation, and validation labels for a validation dataset and test labels for a test dataset; organizing log-text examples in the validation dataset into a plurality of time windows; concatenating log-text examples in each time window; providing the concatenated log-text examples and the rules for weak annotation to a weak annotation framework, to a LLM training dataset; training a LLM with the LLM training dataset; collecting runtime log-texts from the network devices for a period of time; concatenating the runtime log-texts for the period of time; and prompting the LLM for analysis with the concatenated log-texts, wherein the LLM outputs a response of anomaly or no anomaly and a confidence in the response.

17 Claims, 3 Drawing Sheets

(51) Int. Cl.
    *G06F 11/20*        (2006.01)
    *G06N 3/0895*     (2023.01)

(56)              References Cited

OTHER PUBLICATIONS

Komadina A. Comparative Analysis of Anomaly Detection Approaches in Firewall Logs: Integrating Light-Weight Synthesis of Security Logs and Artificially Generated Attack Detection. Sensors. 2024; 24(8):2636. https://doi.org/10.3390/s24082636 (Year: 2024).*
Rahul Kale, Vrizlynn L.L. Thing, Few-shot weakly-supervised cybersecurity anomaly detection, Computers & Security, https://doi.org/10.1016/j.cose.2023.103194 (Year: 2023).*

* cited by examiner

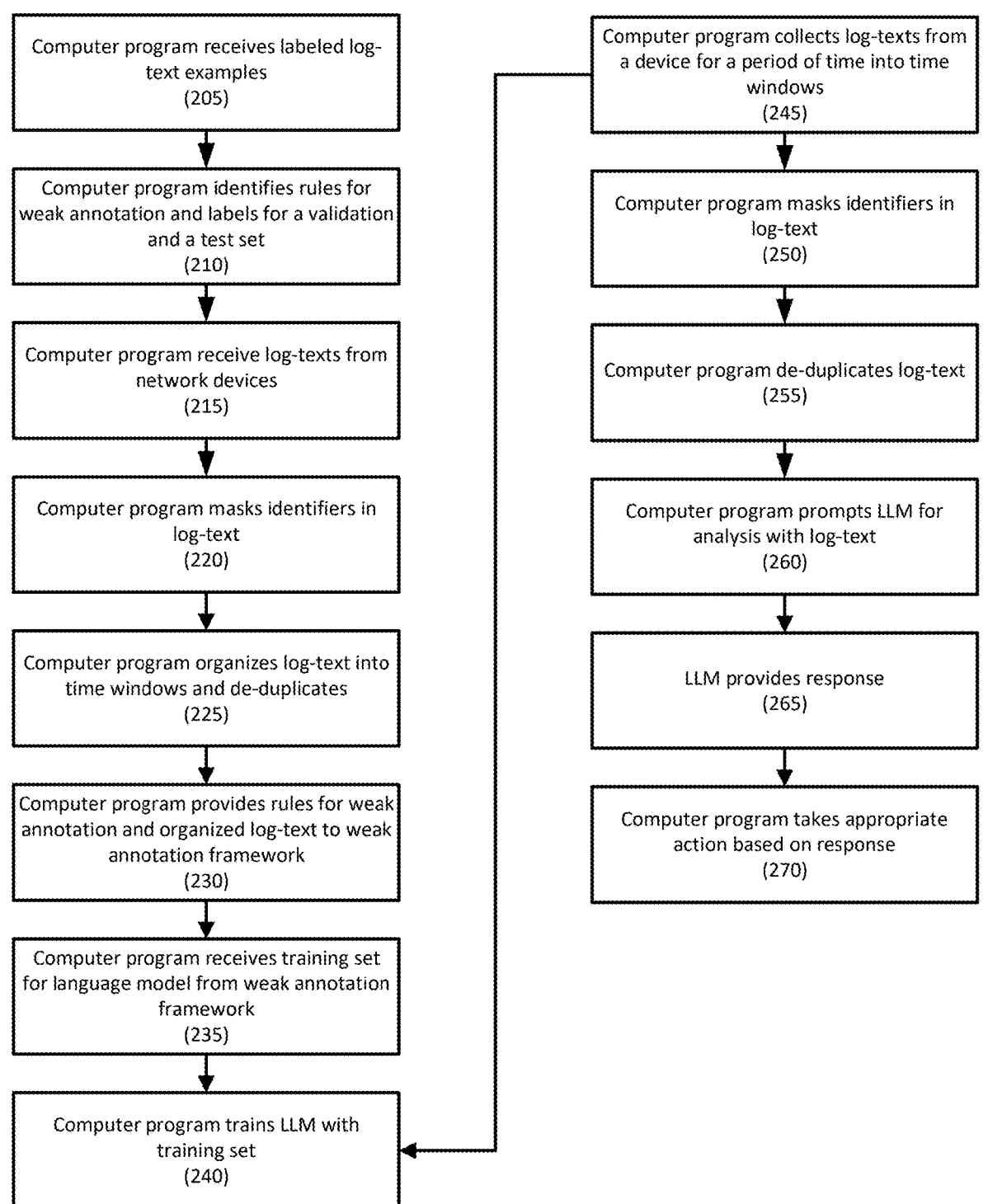

Computer program receives labeled log-text examples
(205)

Computer program identifies rules for weak annotation and labels for a validation and a test set
(210)

Computer program receive log-texts from network devices
(215)

Computer program masks identifiers in log-text
(220)

Computer program organizes log-text into time windows and de-duplicates
(225)

Computer program provides rules for weak annotation and organized log-text to weak annotation framework
(230)

Computer program receives training set for language model from weak annotation framework
(235)

Computer program trains LLM with training set
(240)

Computer program collects log-texts from a device for a period of time into time windows
(245)

Computer program masks identifiers in log-text
(250)

Computer program de-duplicates log-text
(255)

Computer program prompts LLM for analysis with log-text
(260)

LLM provides response
(265)

Computer program takes appropriate action based on response
(270)

FIGURE 2

SYSTEMS AND METHOD FOR ANOMALY DETECTION PIPELINE WITH FEW-SHOT LANGUAGE MODELS

RELATED APPLICATIONS

This application claims priority to, and the benefit of, Greek patent application No. 20240100392, filed May 23, 2024, the disclosure of which is hereby incorporated, by reference, in its entirety.

BACKGROUND OF THE INVENTION

1. Field of the Invention

Embodiments generally relate to systems and methods for anomaly detection pipeline with few-shot language models.

2. Description of the Related Art

Network infrastructures for large organizations often include a substantial number of multivendor devices, such as routers and switches. This network infrastructure supports many uses across the organization, such as access to compute, Internet connectivity, local-area file sharing, etc. As such, potential issues with the network, e.g., devices of major importance crashing, etc., can have a high cost for the organization.

During use, each device produces logs describing its current state as well as a series of other metrics. A subject-matter expert (SME) reviewing this information could identify whether a particular device may be heading to a critical state or not. Because the network is large and has complex connectivity dependencies, however, manual tracking of particular devices is infeasible.

SUMMARY OF THE INVENTION

Systems and methods for anomaly detection pipeline with few-shot language models are disclosed. According to an embodiment, a method may include: (1) receiving, by an anomaly detection computer program, a plurality of log-text examples from a plurality of network devices and labels for each of the log-text examples, wherein each label indicates if the log-text example is anomalous or not anomalous; (2) identifying, by the anomaly detection computer program and from the plurality of log-text examples and labels, rules for weak annotation, and validation labels for a validation dataset and test labels for a test dataset; (3) organizing, by the anomaly detection computer program, the plurality of log-text examples in the validation dataset into a plurality of time windows; (4) concatenating, by the anomaly detection computer program, the plurality of log-text examples in each time window; (5) providing, by the anomaly detection computer program, the concatenated log-text examples and the rules for weak annotation to a weak annotation framework, to a large language model (LLM) training dataset; (6) training, by the anomaly detection computer program, a LLM with the LLM training dataset; (7) collecting, by the anomaly detection computer program, a plurality of runtime log-texts from the network devices for a period of time; (8) concatenating, by the anomaly detection computer program, the runtime log-texts for the period of time; and (9) prompting, by the anomaly detection computer program, the LLM for analysis with the concatenated log-texts, wherein the LLM outputs a response of anomaly or no anomaly and a confidence in the response.

In one embodiment, the method may also include: pre-processing, by the anomaly detection computer program, the plurality of log-text examples in the validation dataset before organizing the plurality of log-text examples into the plurality of time windows; and de-duplicating, by the anomaly detection computer program, the plurality of log-text examples in each of the plurality of time windows.

In one embodiment, the plurality of log-text examples are pre-processed to mask identifiers for the plurality of network devices.

In one embodiment, the method may also include: pre-processing, by the anomaly detection computer program, the plurality of runtime log-texts; and de-duplicating, by the anomaly detection computer program, the plurality of runtime log-texts. The plurality of runtime log-texts are pre-processed to mask identifiers for the plurality of network devices.

In one embodiment, the method may also include: re-routing, by the anomaly detection computer program, network traffic based on the response indicating an anomaly.

In one embodiment, the method may also include: ordering, by the anomaly detection computer program, a replacement network device in response indicating an anomaly.

In one embodiment, the method may also include: populating, by the anomaly detection computer program, a network graph with a status for each of the plurality of network devices.

According to another embodiment, a system may include: a plurality of network devices in a computer network, each network device generating a log-text comprising status information for the network device; a database comprising a plurality of log-text examples, each log-text example comprising a label, wherein each label indicates if the log-text example is anomalous or not anomalous; and an electronic device executing an anomaly detection computer program that is configured to receive the plurality of log-text examples; to identify, from the plurality of log-text examples and labels, rules for weak annotation, and validation labels for a validation dataset and test labels for a test dataset; to organize the plurality of log-text examples in the validation dataset into a plurality of time windows; to concatenate the plurality of log-text examples in each time window; to provide the concatenated log-text examples and the rules for weak annotation to a weak annotation framework, to a large language model (LLM) training dataset; to train a LLM with the LLM training dataset; to collect a plurality of runtime log-texts from the network devices for a period of time; to concatenate the runtime log-texts for the period of time; and to prompt the LLM for analysis with the concatenated log-texts, wherein the LLM outputs a response of anomaly or no anomaly and a confidence in the response.

In one embodiment, the electronic device is further configured to pre-process the plurality of log-text examples in the validation dataset before organizing the plurality of log-text examples into the plurality of time windows; and to de-duplicate the plurality of log-text examples in each of the plurality of time windows.

In one embodiment, the plurality of log-text examples are pre-processed to mask identifiers for the plurality of network devices.

In one embodiment, the electronic device is further configured to pre-process the plurality of runtime log-texts; and to de-duplicate the plurality of runtime log-texts.

In one embodiment, the plurality of runtime log-texts are pre-processed to mask identifiers for the plurality of network devices.

In one embodiment, the electronic device is further configured to re-route network traffic based on the response indicating an anomaly.

In one embodiment, the electronic device is further configured to order a replacement network device in response indicating an anomaly.

In one embodiment, the electronic device is further configured to populate a network graph with a status for each of the plurality of network devices.

According to another embodiment, a non-transitory computer readable storage medium, including instructions stored thereon, which when read and executed by one or more computer processors, cause the one or more computer processors to perform steps comprising: receiving a plurality of log-text examples from network devices and labels for each of the log-text examples, wherein each label indicates if the log-text example is anomalous or not anomalous; identifying, from the plurality of log-text examples and labels, rules for weak annotation, and validation labels for a validation dataset and test labels for a test dataset; organizing the plurality of log-text examples in the validation dataset into a plurality of time windows; concatenating the plurality of log-text examples in each time window; providing the concatenated log-text examples and the rules for weak annotation to a weak annotation framework, to a large language model (LLM) training dataset; training a LLM with the LLM training dataset; collecting a plurality of runtime log-texts from the network devices for a period of time; concatenating the runtime log-texts for the period of time; and prompting the LLM for analysis with the concatenated log-texts, wherein the LLM outputs a response of anomaly or no anomaly and a confidence in the response.

In one embodiment, the non-transitory computer readable storage medium may also include instructions stored thereon, which when read and executed by one or more computer processors, cause the one or more computer processors to perform steps comprising: pre-processing the plurality of log-text examples in the validation dataset to mask identifiers for the plurality of network devices before organizing the plurality of log-text examples into the plurality of time windows; de-duplicating the plurality of log-text examples in each of the plurality of time windows; pre-processing the plurality of runtime log-texts to mask identifiers for the plurality of network devices; and de-duplicating the plurality of runtime log-texts.

In one embodiment, the non-transitory computer readable storage medium may also include instructions stored thereon, which when read and executed by one or more computer processors, cause the one or more computer processors to perform steps comprising: re-routing network traffic based on the response indicating an anomaly.

In one embodiment, the non-transitory computer readable storage medium may also include instructions stored thereon, which when read and executed by one or more computer processors, cause the one or more computer processors to perform steps comprising: ordering a replacement network device in response indicating an anomaly.

BRIEF DESCRIPTION OF THE DRAWINGS

For a more complete understanding of the present invention, the objects and advantages thereof, reference is now made to the following descriptions taken in connection with the accompanying drawings in which:

FIG. 2 depicts a method for anomaly detection pipeline with few-shot language models according to an embodiment;

DETAILED DESCRIPTION OF PREFERRED EMBODIMENTS

Embodiments generally relate to systems and methods for anomaly detection pipeline with few-shot language models.

Embodiments may use a text input (log-text) that is pre-processed and passed to a language model classifier. Embodiments may prepare and weakly-annotate data based on pre-provided rules and may train a few-shot language model classifier on the weakly-annotated data.

Embodiments may provide at least some of the following technical advantages. First SMEs can directly influence and/or correct the model through their labelling. Next, due to the supervised nature, embodiments are interpretable in that the provided signal can be investigated. Further, the amount of data labelling required may be reduced based on the pre-trained language model's understanding of the similarity between log-texts.

Figure 1:
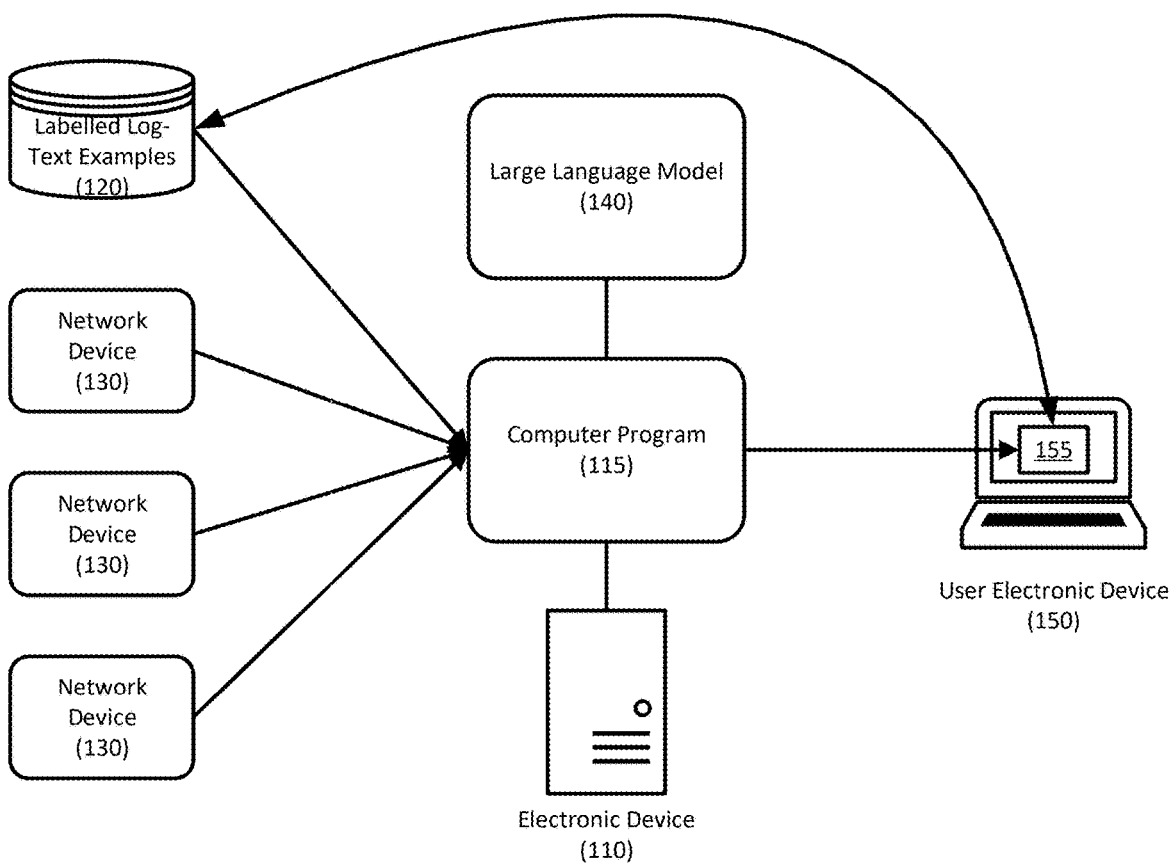
FIG. 1 depicts a system for anomaly detection pipeline with few-shot language models according to an embodiment.

FIG. 1 depicts a system for anomaly detection pipeline with few-shot language models according to an embodiment. System 100 may include electronic device 110, which may be a server (e.g., physical and/or cloud-based), a computer (e.g., workstation, desktop, laptop, notebook, tablet, etc.), a smart device (e.g., smart phone, smart watch, etc.), an Internet of Things (IoT) appliance, etc. Electronic device 110 may execute computer program 115, which may be an anomaly detection computer program.

Computer program 115 may interface with labeled log-text examples 120, which may be log-text examples from network device(s) 130 that have been labeled by SMEs.

Network devices 130 may include any network hardware that may generate a log-text file, such as routers, switches, etc. The log-text file may include information on the particular network device, such as status information, health information, etc.

System 100 may further include large language model 140, which may be any suitable model (e.g., OpenAI GPT-3, BERT, ROBERTa, T5, etc.).

System 100 may also include user electronic device 150 that may execute user computer program 155. User computer program 155 may be used, for example, by SMEs to label log-texts, to receive a response from LLM 140, etc.

Referring to FIG. 2, a method for anomaly detection pipeline with few-shot language models is disclosed according to an embodiment.

In step 205, a computer program, such as an anomaly detection computer program, may receive log-text examples from network devices that have been manually labeled by SMEs. The examples may be labeled as anomalous or not anomalous.

In step 210, from the labelled examples, the computer program may identify rules for weak annotation and validation data labels for a validation dataset and a test dataset.

In one embodiment, the rules for labeling individual data points may be provided by SMEs in, for example natural language form. The data points may be represented as pairs of error codes and text descriptions for the state of a device. For example, a SME may choose to use a rule such as "if this error code is seen, then this is most likely an anomaly," "this error code is benign," or "this text contains these words that indicate normality." The rules do not have to be absolute; they just must be right most of the time.

The rules may be converted into Python code and provided to an open-source Python library, such as Snorkel, to get weak annotations of data, and may be used for weak annotations.

The labels for validation and test set may also be provided by the SME directly. For example, the labels may be "normal" or "anomalous." Those labels apply to the behavior of a device during a time window, e.g., for a duration of 1 hour, was the device misbehaving or not?).

In step 215, the computer program may receive a large dataset of log-texts from network devices and may pre-process the log-texts. For example, a large dataset may include data that is partially labelled by SMEs, and partially by the computer program that identifies the rules. The large dataset may then be split into a training dataset, a validation dataset, and a test dataset. The large dataset may be randomly split into these datasets. Each of the training dataset, the validation dataset, and the test dataset may include example inputs (e.g., text) and example outputs (labels). The validation dataset is used to tune the hyperparameters of the model which cannot be tuned with the training dataset.

Once the best hyperparameters are identified, the model may be evaluated by checking whether the model can accurately predict the test set (usually against a simple baseline model).

For example, in step 220, the computer program may mask any identifiers (e.g., the device identifier, IP addresses, paths, etc.) in the log-text. In one embodiment, regular expressions (regexes) may be used to identify the identifiers to be masked.

In step 225, may organize the log-texts into time windows and de-duplicate the log-texts within the time windows. For example, a network device may produce a log-text every 5 minutes, or in response to a change in condition. The time windows, which may be 1 hour, 30 minutes, or any other suitable time period, may be populated with the log-texts. If the log-texts for a network device are all the same (i.e., there are no changes), the log-texts may be de-duplicated so that only log-text for the device may be in the time window.

In one embodiment, the user may select the size of the time windows, and different devices may have different time windows. It is not necessary for each device to log a time window at every time window-duration. As an illustrative and non-limiting example, with two devices, D1, and D2, the SME may decide to track time windows of a 15-minute size. Then, at time, 12:00, D1 may have a time-window with log-texts appearing from time 12:00 until time 12:15 and D2 may also have a time-window during the same time if it produced any log-texts during that time, otherwise no. When predictions are made, they are made per time window per device, e.g., one prediction for {D1, 12:00-12:15}, another one for {D2, 12:00-12:15}, another one for {D1, 12:15-12:30}, and so on.

The log-texts in the time window may be concatenated into a paragraph form by, for example, appending each log-text to the next.

In step 230, the computer program may provide the rules for weak annotation from step 210 and the concatenated log-texts to a weak annotation framework. In step 235, the weak annotation framework may output a LLM training set to train a language model.

In step 240, the computer program may train a LLM with the training dataset.

In step 245, the computer program may collect runtime log-texts from one or more network devices for a period of time.

In steps 250 and 255, the computer program may pre-process the log-texts by masking identifiers in the log-texts, collecting the log-texts for the time period, de-duplicating the log-texts, and concatenating the log-texts, such as described in steps 220 and 225, above.

In step 260, the computer program may prompt the LLM for analysis with the concatenated runtime log-texts for the time period, and in step 265, the LLM may provide a response. The response may be anomaly or no anomaly, and may include a confidence in the response.

In step 270, the computer program may take an appropriate action based on the response. For example, if no anomaly was identified, the computer program may take no further action and may continue to receive log-texts from network devices. If there was an anomaly, the computer program may order a replacement device, may re-route traffic, or may take any other proactive action.

In one embodiment, the computer program may populate a network graph with the statuses of each network device. This may assist in downstream debugging of network overall state.

In one embodiment, the computer program may trigger an automated artificial intelligence agent that may perform additional actions, such as attempting an automated recovery of the network state, escalating the status to a SME, etc.

Figure 3:
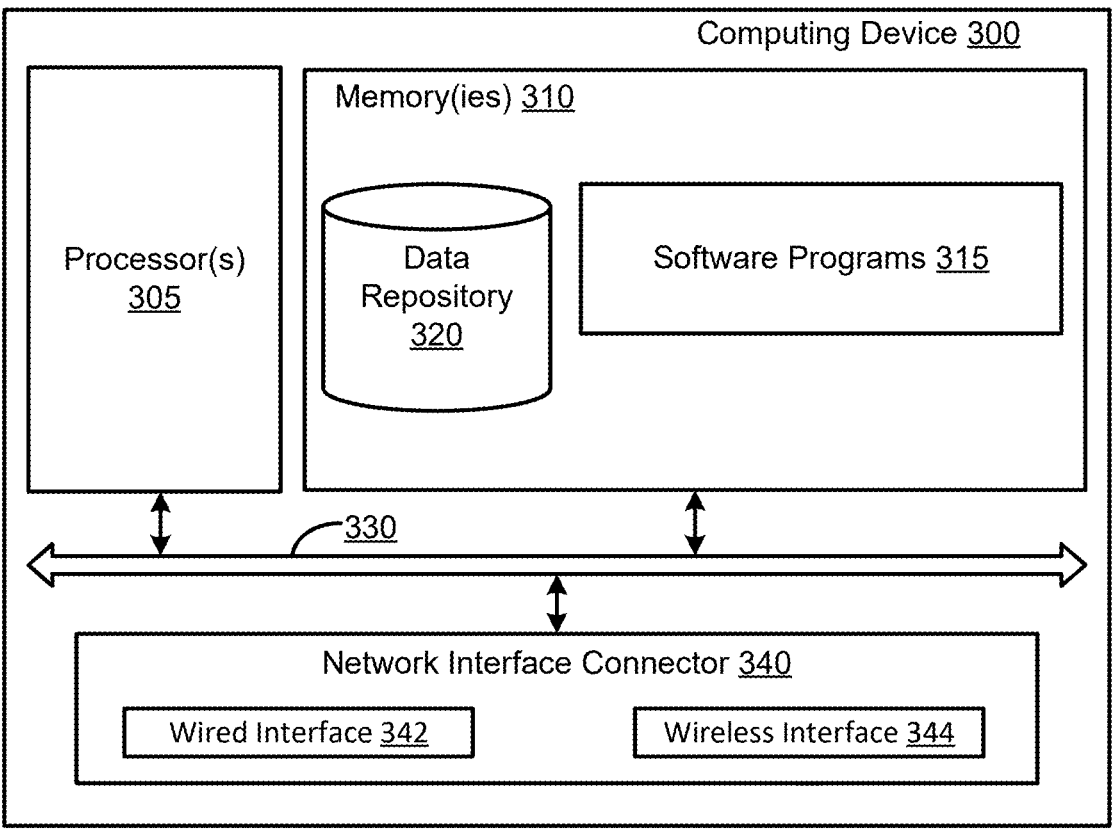
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or main-frame, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by an anomaly detection computer program, a plurality of log-text examples from a plurality of network devices and labels for each of the log-text examples, wherein each label indicates if the log-text example is anomalous or not anomalous;

identifying, by the anomaly detection computer program and from the plurality of log-text examples and labels, rules for weak annotation, and validation labels for a validation dataset and test labels for a test dataset;

organizing, by the anomaly detection computer program, the plurality of log-text examples in the validation dataset into a plurality of time windows;

concatenating, by the anomaly detection computer program, the plurality of log-text examples in each time window;

providing, by the anomaly detection computer program, the concatenated log-text examples and the rules for weak annotation to a weak annotation framework to obtain a large language model (LLM) training dataset;

training, by the anomaly detection computer program, a LLM with the LLM training dataset;

collecting, by the anomaly detection computer program, a plurality of runtime log-texts from the network devices for a period of time;

concatenating, by the anomaly detection computer program, the runtime log-texts for the period of time;

prompting, by the anomaly detection computer program, the LLM for analysis with the concatenated log-texts, wherein the LLM outputs a response of anomaly or no anomaly and a confidence in the response; and re-routing, by the anomaly detection computer program, network traffic away from one of the network devices based on the response indicating an anomaly with the network device.

2. The method of claim 1, further comprising:

pre-processing, by the anomaly detection computer program, the plurality of log-text examples in the validation dataset before organizing the plurality of log-text examples into the plurality of time windows; and de-duplicating, by the anomaly detection computer program, the plurality of log-text examples in each of the plurality of time windows.

3. The method of claim 1, wherein the plurality of log-text examples are pre-processed to mask identifiers for the plurality of network devices.

4. The method of claim 1, further comprising:

pre-processing, by the anomaly detection computer program, the plurality of runtime log-texts; and de-duplicating, by the anomaly detection computer program, the plurality of runtime log-texts.

5. The method of claim 4, wherein the plurality of runtime log-texts are pre-processed to mask identifiers for the plurality of network devices.

6. The method of claim 1, further comprising:

ordering, by the anomaly detection computer program, a replacement network device based on the response indicating an anomaly.

7. The method of claim 1, further comprising:

populating, by the anomaly detection computer program, a network graph with a status for each of the plurality of network devices.

8. A system, comprising:

a plurality of network devices in a computer network, each network device generating a log-text comprising status information for the network device;

a database comprising a plurality of log-text examples, each log-text example comprising a label, wherein each label indicates if the log-text example is anomalous or not anomalous; and an electronic device executing an anomaly detection computer program that is configured to receive the plurality of log-text examples; to identify, from the plurality of log-text examples and labels, rules for weak annotation, and validation labels for a validation dataset and test labels for a test dataset; to organize the plurality of log-text examples in the validation dataset into a plurality of time windows; to concatenate the plurality of log-text examples in each time window; to provide the concatenated log-text examples and the rules for weak annotation to a weak annotation framework to obtain a large language model (LLM) training dataset; to train a LLM with the LLM training dataset; to collect a plurality of runtime log-texts from the network devices for a period of time; to concatenate the runtime log-texts for the period of time; to prompt the LLM for analysis with the concatenated log-texts, wherein the LLM outputs a response of anomaly or no anomaly and a confidence in the response; and to re-route network traffic away from one of the network devices based on the response indicating an anomaly with the network device.

9. The system of claim 8, wherein the electronic device is further configured to pre-process the plurality of log-text examples in the validation dataset before organizing the plurality of log-text examples into the plurality of time windows; and to de-duplicate the plurality of log-text examples in each of the plurality of time windows.

10. The system of claim 8, wherein the plurality of log-text examples are pre-processed to mask identifiers for the plurality of network devices.

11. The system of claim 8, wherein the electronic device is further configured to pre-process the plurality of runtime log-texts; and to de-duplicate the plurality of runtime log-texts.

12. The system of claim 11, wherein the plurality of runtime log-texts are pre-processed to mask identifiers for the plurality of network devices.

13. The system of claim 8, wherein the electronic device is further configured to order a replacement network device based on the response indicating an anomaly.

14. The system of claim 8, wherein the electronic device is further configured to populate a network graph with a status for each of the plurality of network devices.

15. A non-transitory computer readable storage medium, including instructions stored thereon, which when read and executed by one or more computer processors, cause the one or more computer processors to perform steps comprising: receiving a plurality of log-text examples from network devices and labels for each of the log-text examples, wherein each label indicates if the log-text example is anomalous or not anomalous; identifying, from the plurality of log-text examples and labels, rules for weak annotation, and validation labels for a validation dataset and test labels for a test dataset; organizing the plurality of log-text examples in the validation dataset into a plurality of time windows; concatenating the plurality of log-text examples in each time window; providing the concatenated log-text examples and the rules for weak annotation to a weak annotation framework to obtain a large language model (LLM) training dataset; training a LLM with the LLM training dataset; collecting a plurality of runtime log-texts from the network devices for a period of time; concatenating the runtime log-texts for the period of time; prompting the LLM for analysis with the concatenated log-texts, wherein the LLM outputs a response of anomaly or no anomaly and a confidence in the response; and re-routing network traffic away from one of the network devices based on the response indicating an anomaly with the network device.

16. The non-transitory computer readable storage medium of claim 15, further including instructions stored thereon, which when read and executed by one or more computer processors, cause the one or more computer processors to perform steps comprising:
    pre-processing the plurality of log-text examples in the validation dataset to mask identifiers for the plurality of network devices before organizing the plurality of log-text examples into the plurality of time windows; de-duplicating the plurality of log-text examples in each of the plurality of time windows; pre-processing the plurality of runtime log-texts to mask identifiers for the plurality of network devices; and de-duplicating the plurality of runtime log-texts.

17. The non-transitory computer readable storage medium of claim 15, further including instructions stored thereon, which when read and executed by one or more computer processors, cause the one or more computer processors to perform steps comprising: ordering a replacement network device based on the response indicating an anomaly.

* * * * *